United States Patent [19]

Kellner

[11] 4,175,328

[45] Nov. 27, 1979

[54] ARRANGEMENT FOR PRODUCING PHOTOGRAPHIC PICTURES SUITABLE FOR PHOTOGRAMMETRIC SURVEY OF SPATIAL OBJECTS

[76] Inventor: Helmut Kellner, Wolfsgarten 14, 3406 Bovenden 1, Fed. Rep. of Germany

[21] Appl. No.: 814,147

[22] Filed: Jul. 11, 1977

[30] Foreign Application Priority Data

Jul. 12, 1976 [DE] Fed. Rep. of Germany ....... 2631226

[51] Int. Cl.² ...................... B43L 13/20; G01C 11/12
[52] U.S. Cl. ...................................... 33/1 A; 33/20 D
[58] Field of Search ........................ 33/1 R, 1 A, 20 D

[56] References Cited

U.S. PATENT DOCUMENTS

| 2,795,046 | 6/1957 | Deker | 33/1 A |
| 3,307,450 | 3/1967 | Santoni | 33/1 A |
| 3,765,094 | 10/1973 | Yzerman | 33/1 A |
| 3,925,897 | 12/1975 | Ferri et al. | 33/1 A |

FOREIGN PATENT DOCUMENTS 1178969 12/1958 France ....................... 33/1 A

*Primary Examiner*—William D. Martin, Jr.
*Attorney, Agent, or Firm*—Max Fogiel

[57] ABSTRACT

An arrangement for producing photographs which may be used for photogrammetric surveys of spatial objects, in which control points are established in the spatial object. Two photographs are taken using central projections with different positions of the projection center. The control points are the component of a mobile control point system having a reference with four points with known position coordinates constituting a quadrangle. At least two space points located outside the reference plane, have unequal or identical position coordinates relative to the reference plane. At least the space position coordinates of one space point and the space position coordinates of the other space point are known, and at least six such points appear on each of the two photographs. To increase the accuracy of determining the unknown in the transformation equations, a reference plane with more than four points, preferably sixteen points, is introduced into the spatial object to be measured. For more accurate determination of the two projection centers, a reference plane with more than two space points is introduced into the spatial object to be measured. For control purposes, more than two photographs are made with varying spatial positions of the projection centers.

12 Claims, 6 Drawing Figures

$$Z_o = Z \frac{\overline{O'\overline{Q}}}{\overline{Q'\overline{Q}}}$$

$$Z_0 = Z \frac{\overline{O'\bar{M}}}{\overline{M'\bar{M}}}$$

$$Z_R = Z_{o_1} \frac{\overline{R'\bar{R}_2}}{\overline{O'_1 \bar{R}_1}}$$

$$Z_R = Z_{o_2} \frac{\overline{R'\bar{R}_1}}{\overline{O'_2 \bar{R}_2}}$$

ARRANGEMENT FOR PRODUCING PHOTOGRAPHIC PICTURES SUITABLE FOR PHOTOGRAMMETRIC SURVEY OF SPATIAL OBJECTS

BACKGROUND OF THE INVENTION

The present invention relates to a method for producing photographic pictures for the photogrammetric surveying of spatial objects of suitable pictures, wherein the spatial objects control points are established and two photographic shots, using central projection with different position of the projection center are produced. Then a method for evaluating the pictures taken in the photogrammetrical surveying of spatial objects is described, and a device is illustrated which is used in the manufacture of the photographic pictures.

The use of miniature pictures for terrestrial surveying is already known in the art. In the terrain, various control points are placed which must be surveyed before making the miniature picture. The control points must be placed in the terrain so as to surround the region to be photographed, so that later an interpolation is possible. To evaluate the pictures, the internal and external orientation must be determined. This means that for each camera, the calibrated focal length, c, which only approximates the focal length, the principal point and the distortion, and as external orientation the position of the projection center in space and the orientation of the photograph perpendicular according to the three solid angles must be determined and calculated. By means of the internal and external orientation, the coordinates of the object points can be determined from the coordinates of the image points on both photographs. This method is not suitable for evaluating traffic accidents, because the introduction of the individual control points and the subsequent geodetic surveying requires a relatively long period of time which is not available with accidents because the area as a rule must be cleared quickly. From the German Laid Open Document No. 2 430 851, coordinate measurement by means of photogrammetric methods is already known. Electronic TV camera tubes are used and a control point system, not described here, is introduced into the object area. With this method also, the dates of internal and external orientation must be determined. Also, with this method only discrete points (previously marked in the terrain) can be traced or their spatial position determined. With this method, the high information content of a photograph is absent. This method also is not suited for evaluating traffic accidents, because only the discrete points are present and an immovable evaluation of the accident is assumed, aside from the amount of time spent.

A photographic picture results from a central projective display of the object area on a plane (image plane). If the object is a plane, the image is unique i.e., an image point corresponds to an object point. Between these planes there is a colinear relationship which is completely described by the association of four corresponding points in both planes. A necessary requirement is that no three of the four points may lie on a straight line. If four such corresponding points in both planes are known, the position of any object points can be derived from associate image points; a single-picture measurement is sufficient.

However, to reconstruct a spatial (solid) body, a spatial object, from plane pictures, two pictures with spatially different positions of the projection centers (picture base b) must be taken and evaluated. If the geometrical parameters of the pictures are known, the picture optical path can be reconstructed and the object can be represented by the spatial intersection of hologue beams. This involves a two-picture measurement.

One of the general case of two-picture measurement, where the mutual position of the two shooting bundles of rays is arbitrary, the stereophotogrammetry forms a special case. Here the conditions are fulfilled which are related to the spatial perception of men. The shooting direction in this case should be parallel or convergent.

A photographic picture is considered as a photogrammetric picture when the geometric parameters of the image are known. These are the parameters of "internal orientation" namely (a) the position of principal point H' in the image plane E, i.e., the orthogonal projection of the projection center O on the image plane E, (b) the calibrated focal length c, i.e., the distance OH' and (c) the distortion, i.e., the deviation from the central projection, due to the optical system.

The position of principal point H' in the image plane E is determined by the position coordinates $x^+$, $y^+$ in a cartesian image coordinate system ($x^+$, $y^+$). Marks on the picture frame which are placed with each shot, define this local coordinate system.

A camera built up in this form is called a mapping camera. FIG. 1 shows the typical construction of such a mapping camera. The definition of the shooting geometry permits both the complete reconstruction of the shooting bundle of rays from the photographic image. The position of a shooting bundle of rays in space is established by the parameters of "external orientation" in its relation to a higher space coordinate system (reference system) x, y, z.

The six elements of "external orientation" are:

$X_o$, $Y_o$, $Z_o$: space coordinates of projection center O in the reference system . . . : orientation angles to determine the shooting direction OH' in space and the orientation of image coordinate system $x^+$, $y^+$ Points in space where position in the reference system is known, are called control points.

Previously used methods are based on single-photograph measurement or two-photograph measurement.

In all cases, where one may assume that both image and object are a plane, a single-photograph measurement can be made. In the rectification of aerial photographs of flat terrain, this method is used in practice. When taking accident pictures the street surface is a plane, at least by stretches, and skidmarks on the road can be reconstructed from the pictures when the position of four points on the road can be determined and identified on the picture. For the calculative rectification, the following formulas for the central projective photographing (colinear relationship) hold:

$$X = (a_1 x^+ + a_2 y^+ + a_3)/(c_1 x^+ + c_2 y^+ + 1)$$
$$Y = (b_1 x^+ + b_2 y^+ + b_3)/(c_1 x^+ + c_2 y^+ + 1) \qquad (1)$$

where:

$x^+$, $y^+$ are the image coordinates

X, Y the object coordinates in the terrain $a_1 \ldots b_2 \ldots c_2$ the eight unknowns.

A total of eight unknowns must be determined. This condition is met by four points. The advantage of the method is, that, neglecting the distortion, no mapping cameras are required since the parameters of the internal orientation of the shooting camera need not be known.

In the two-image picture measurement, one uses stereo pictures since the evaluation of these pictures, the stereoscopic visual ability of man is used for the association of corresponding points in both pictures. Particularly in the terrestrial photogrammetry, as used for shooting traffic accidents, double mapping cameras, e.g., the stereo mapping camera SMK 120 of Zeiss with a fixed shooting base of +120 cm and glass plates as picture carriers are used.

A double mapping camera is made up of two mapping cameras. They are mounted on a common carrier with a known shooting base, making sure that the image planes and the image coordinate systems are parallel to each other. The external orientation is determined in relation to the perpendicular by having the double camera horizontal during a shooting. The advantage of this system is the establishment of inside and mutual orientation of the cameras and the possibility of a common external orientation. The disadvantage is high technical effort and resulting high cost for the cameras and the complicated handling.

Accordingly, it is an object of the present invention to avoid the disadvantages of the state of the art and to provide a method of the above type which permits the shooting of spatial objects with simple cameras, without using mapping cameras, with the pictures suitable for the photogrammetric survey with sufficient accuracy.

Another object of the present invention is to provide an arrangement of the foregoing character which may be simply carried out in a reliable manner.

A further object of the present invention is to provide an arrangement, as described, which may be readily maintained in service and which may be economically fabricated.

SUMMARY OF THE INVENTION

The objects of the present invention are achieved by providing that the control points are part of a mobile control point system comprising a reference plane with at least four points of known coordinates which constitute a guadrangle, and at least two points outside the reference plane with unequal (or identical) position coordinates in relation to the reference plane, with at least the position coordinates (or space coordinates) of one point in space and the space coordinates of the other point in space being known, and at least six such points being shown on each of the two photographs.

To increase the accuracy of determining the unknown in the transformation equations, a reference plane with more than four points, preferably sixteen points, is introduced into the spatial object to be measured. To exactly determine the two projection centers, a reference plane with more than two space points is introduced into the spatial object to be measured.

For control purposes, more than two shootings with different spatial positions of the projection centers can be made.

The method for evaluating the photographs, made in the manner described, is as follows: Using the comparator, the image coordinates of the six points are determined, the transformation equations of the collinear transformation of the four image points of the quadrangle on the four points of the reference plane are solved and the spatial position of the two projection centers is determined and the object points associated with the image coordinates are projected by means of the transformation equations into the reference plane, and thus transformed image points are determined, and the spatial coordinates of the associate object points are determined by taking the intersection of the two straight lines between the projection center and the transformed image point. The intersection of the two straight lines can be taken in the reference plane and the two straight lines can be made to intersect in the reference plane between the base point of the projection center and the transformed image point; thus the position coordinates of the object point in question and the height of the object point in question above the reference plane can be determined depending on the distance ratio.

The methods in accordance with the invention are based on each other and combine the single-photograph measurement with the two-photograph measurement, with the base selected freely depending on the situation. With every shooting, the reference plane and the image plane actually form two plane surfaces, so that the four points in one plane of the spatial object and the associate image points establish the colinear relationship, thus determining the unknowns of the transformation equations. However, since the actually photographed object space can only be considered as plane in a very inadequate manner, it becomes necessary to determine the spatial position of points in the object space with sufficient accuracy which are outside the reference plane defined by the four points. This requires two photos with different position of the projection centers so that we have here the general case of two-picture measurement without requiring a special base or a specific optical path. It is only important that in both photos at least four points of the reference plane (and at least two space points) are shown. At least two space points outside the reference plane are required for determining the spatial position of the projection center, in each case for the projection center of that particular shot. The space coordinates of each projection center can be determined uniquely when the position coordinates of at least one space point outside the reference plane and the space coordinates of another space point outside the reference plane. Of course, ordinarily the space coordinates of both of these space points or of several other space points are known. It is important that the space points have no common base points. But its possible to work with two space points outside the reference plane which have a common base point; however, then the space coordinates of both space points must be known.

To determine the spatial position of a projection center, an intersection is made in the reference plane between the straight lines through the transformed image points and the base points of the space points; in accordance with the distance ratio, the height of the projection center above the reference plane is determined. To determine the spatial position of a projection center when using two space points outside the reference plane with common base point, an intersection is made between the two straight lines through the transformed image points and the space points.

The arrangement for implementing the method, to produce photographic pictures of spatial objects, is as follows: There is a frame having at least four points in a quadrangle (control points) and in a plane forming the reference plane; in addition, the frame has space points (control points) outside the plane, with the coordinates of at least six points in a system being known. This frame, which on the one hand forms the reference plane with its four points so that the transformation equations can be solved, and, on the other hand, has two more space points outside this plane in order to determine the projection centers, is a portable device which can be made with small dimensions; care should be taken this this device is photographed with each of the two shots. Four control points to form the reference plane are necessary with no three of the four points on a straight line. It is recommended, however, that more control points be provided in order to use other control points in case some control points are accidentally covered on a shot.

In a preferred embodiment, the points outside the plane have various base points so that the position of the projection centers in the reference plane can be easily determined in the reference plane. It is also possible that the space points outside the plane have a common base point. But then the heights of the space points must be known in order to make possible determining the projection center by suitable intersection formation.

The four points are arranged in the plane of the frame in the form of a rectangle, particularly a square. It is sufficient if the mutual distance between control points is about 1 m in order to make shots of traffic accidents and to measure the dimensions. Of course, with a larger frame where the four points of the reference plane are further apart, the accuracy can be increased. However, this is not generally necessary for accident pictures.

The frame can be levelled by means of three adjustment screws so that the plane (reference plane) formed by the four points is a horizontal plane. This has the advantage that the heights of the points of concern are simultaneously absolute heights relative to the reference plane.

The frame is preferably collapsible and in the assembled position alignable with the reproducible reference plane. The collapsibility is such that the frame can be conveniently carried in the trunk of a passenger automobile in order to use it at a place of an accident. The frame may have one or more spirit levels in order to facilitate horizontal leveling.

The novel features which are considered as characteristic for the invention are set forth in particular in the appended claims. The invention itself, however, both as to its construction and its method of operation, together with additional objects and advantages thereof, will be best understood from the following description of specific embodiments when read in connnection with the accompanying drawings.

DESCRIPTION OF THE PREFERRED EMBODIMENTS

Figure 1:
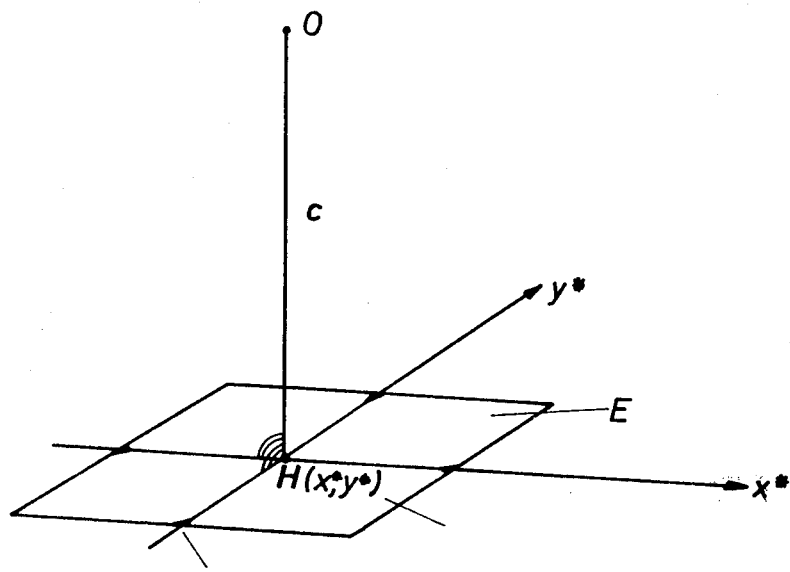
FIG. 1 shows the principle of a mapping camera.

FIG. 1 represents state of the art.

The determination of the eight unknowns for the transformation equations was already explained.

Figure 2:
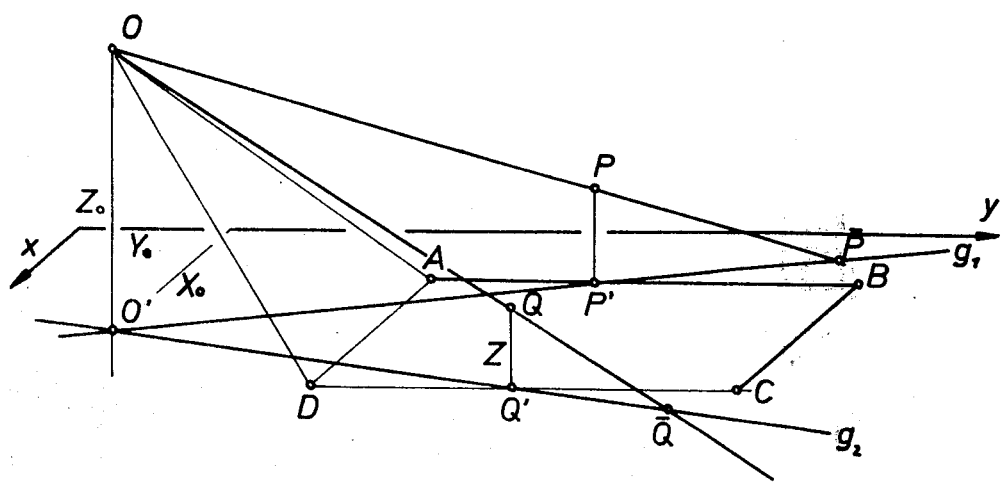
FIG. 2 shows the perspective of the spatial interrelationship in the determination of a projection center.

The determination of a projection center O can be made expediently as shown in FIG. 2. Each space point P outside the reference plane A, B, C, D provides a projection onto the reference plane. Thus one gets point $\overline{P}$, as intersection of a straight line through the projection center O with its space coordinates $X_o$, $Y_o$, $Z_o$ and the space point P with its space coordinates X, Y, Z with the reference plane. The position of this point of intersection $\overline{P}$ in the reference plane is determined by the transformation equations from its image $P^x$ in the picture. The space points P (Z arbitrary) and Q yield the points P', $\overline{P}$ and Q' and $\overline{Q}$ and hence a straight line $g_1$, $g_2$ in the reference plane. The intersection of these straight lines yields the plan view O' with the position coordinates $X_o$, $Y_o$ of the projection center O. The height $Z_o$ is obtained by the intersection of the straight lines through Q and $\overline{Q}$ with the perpendicular through O' on the reference plane. There results the formula shown in FIG. 2. In this manner, the projection center $O_1$ of shot 1 and the the projection $O_2$ of shot 2 is determined.

Figure 3:
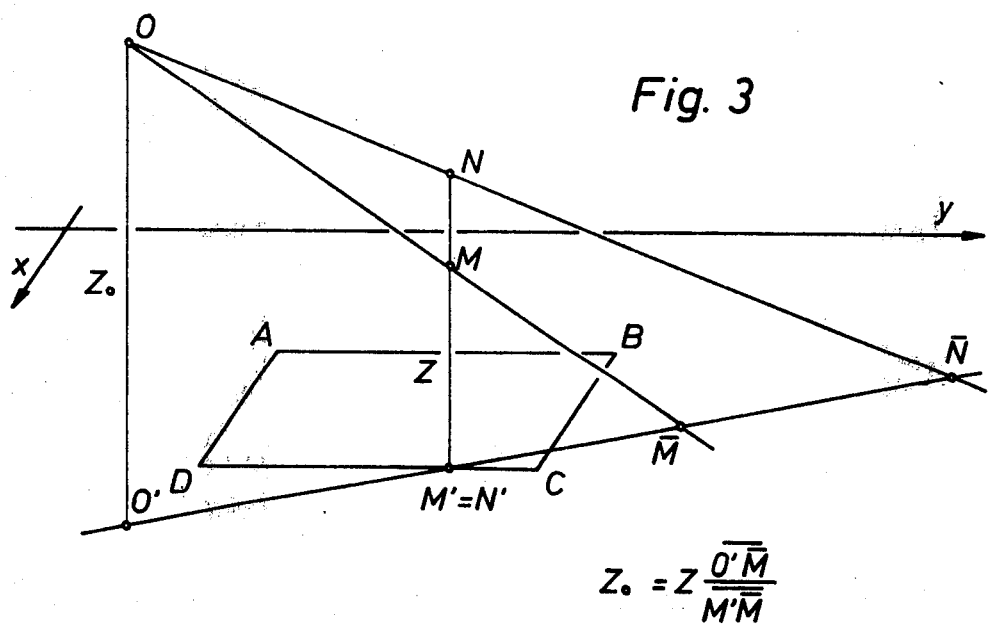
FIG. 3 shows the perspective of the spatial interrelationship in the determination of a projection center in another embodiment.

A projection center O can also be determined by not using two points P and Q with different base points P' and Q' (FIG. 2), but the two points M and N according to FIG. 3, which have the common base points M'=N'. However, in this case it is necessary to know the height of M and the height of N above the reference plane A, B, C, D. The projection center O is determined by direct intersection of straight lines M $\overline{M}$ and N $\overline{N}$. Again, the formula stated in FIG. 3 applies.

Figure 4:
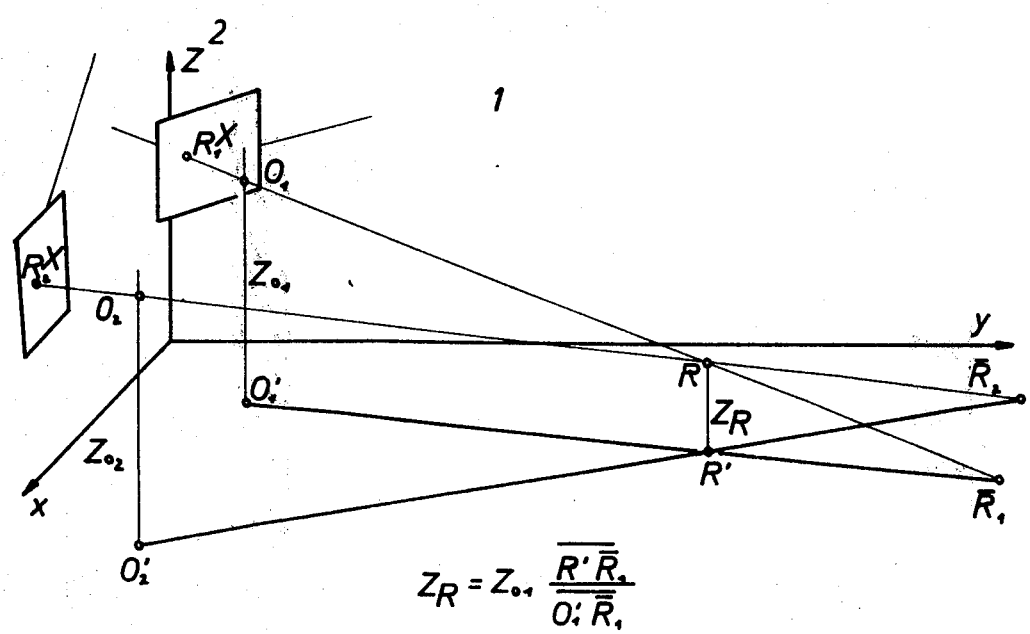
FIG. 4 shows the perspective of the spatial interrelationships in the determination of an object point of concern.

The determination of the space coordinates of an object point R is shown by the schematic in FIG. 4. The projection centers $O_1$ and $O_2$ of shots 1 and 2 are first determined by the method shown in FIGS. 2 or 3. The image points $R_1^X$ and $R_2^X$ of object point R yield a transformed image point each through application of transformation equations (1) on the reference plane. These are the points of intersection $\overline{R}_1$ and $\overline{R}_2$. The intersection of the two straight lines between the base points of the projection centers and the points of intersection of the object point in the reference plane yields the plan view R' of object point R. The two straight lines are the sections $O_1'$, $\overline{R}_1$ and $O_2'$ $\overline{R}_2$. The still missing height $Z_R$ of object point R can be calculated from one of the two formulas shown in FIG. 4 in accordance with the geometric relations provided, with the other formula being used for control purposes.

It is also possible to determine the object point R by a direct intersection. Here the straight lines $O_1$ $\overline{R}_1$ and $O_2$ $\overline{R}_2$ are made to intersect.

The method described can be similarly used with any other object points in question so that, for example, the distance between different object points, for example the length of a skidmark etc. can be easily calculated.

Figure 5:
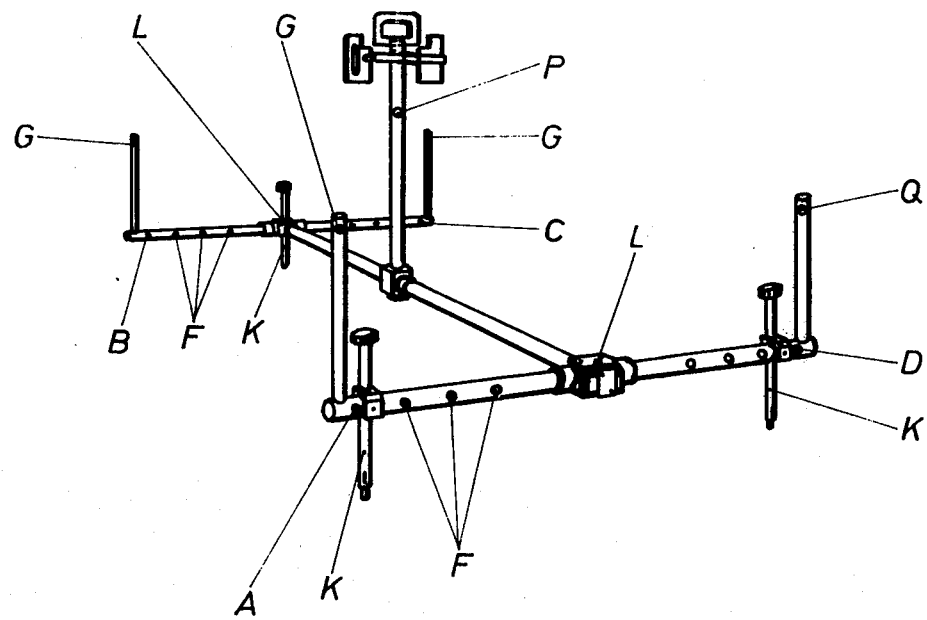
FIG. 5 shows a perspective of the device used in the assembled condition.

FIG. 5 shows the device used for taking the two pictures. This device comprises a collapsible frame which has a sufficient number of hinges and sufficient stiffness in order to reproduce reference plane A, B, C, D. Beside the control points stated above, a number of additional control points F is provided. Altogether, the frame of FIG. 5 has sixteen control points forming the reference plane. Outside the reference plane are the two required points P and Q of which the space coordinates relative to the reference plane are known. For control purposes additional such points G are provided so that two such points are available for evaluation.

The frame also has three adjustment screws K and two spirit levels L in order to set the reference plane A, B, C, D as horizontal plane.

Figure 6:
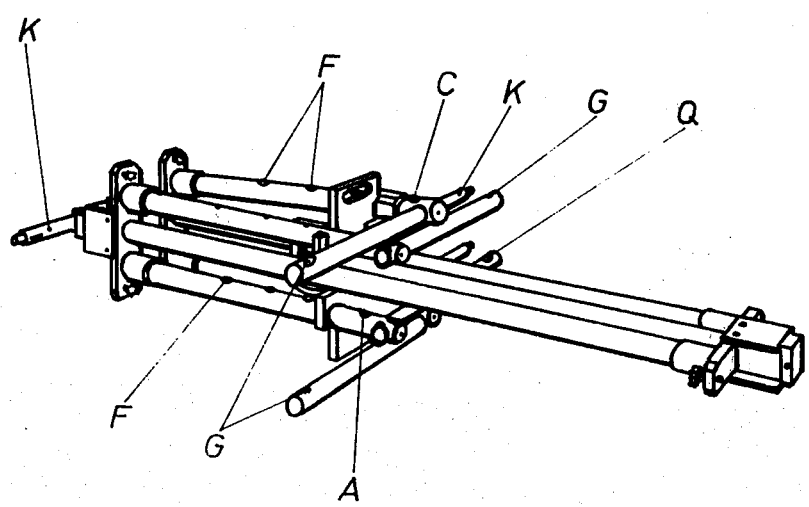
FIG. 6 shows a perspective of the device when collapsed.

FIG. 6 shows the frame collapsed, indicating that it can be easily carried in the trunk of a passenger vehicle.

When taking the photo, e.g., after a traffic accident, the frame is constructed and leveled in accordance with FIG. 5 at the accident site and leveled, in such a way that at least two photos with different projection centers can be made, both shots showing the frames with its control points and the object points involving the accident. Photos can be shot with any simple camera successively from two locations. Only if a moving object is to be measured in this manner will it be necessary to trigger two cameras simultaneously.

The two photos are then surveyed by means of a comparator, to determine the image coordinates of at least six control points. Since comparators are already known in the art, their design and operation is not described here. Then the transformation equations of the colinear transformation of the four image points of the quadrangle on the four points A, B, C, D of the reference plane are solved and the two projection centers $O_1$ and $O_2$ are determined. Then, using the comparator, the image coordinates of object points in question are determined; these image coordinates are transformed by means of the transformation equations into the position coordinates in the reference plane. By intersecting the two straight lines in the reference plane between the base point of the projection center and the transformed image point, the position coordinates of the object point in question and the height of the object point in question above the reference plane in accordance with the distance ratio are determined. This is done for several object points involved. The number and selection of object points depends on the application or the accident, in order to reproduce actual happenings with numerical data.

Without further analysis, the foregoing will so fully reveal the gist of the present invention that others can, by applying current knowledge, readily adapt it for various applications without omitting features that, from the standpoint of prior art, fairly constitute essential characteristicsof the generic or specific aspects of this invention, and therefore, such adaptations should and are intended to be comprehended within the meaning and range of equivalence of the following claims.

What is claimed is:

1. A method for producing photographic pictures suitable for photogrammetric survey of a spatial object, particularly after traffic accidents, comprising the steps of: establishing control points in said spatial object; taking two photographs using central projection with different positions of a projection center; evaluating said photographs by determining image coordinates of said control points and selected object points, said control points being part of a control point system, said system comprising: a reference plane with at least four points having known position coordinates defining a quadrangle, and at least two space points located outside said reference plane having position coordinates relative to said reference plane, at least the position coordinates of one of said space points and the space coordinates of the other of said space points being known; recording image coordinates of said six points and solving transformation equations of collinear transformation of said four image points of the quadrangle onto four points of said reference plane; recording spatial positions of the two projection centers; projecting image coordinates of selected object points onto the reference plane by applying transformation equations for determining transformed image points; forming intersection of two straight lines between the projection center and one of said transformed image points for determining space coordinates of a selected object point.

2. A method as defined in claim 1 including the step of introducing a reference plane with more than four points into the spatial object to be measured for increasing the accuracy of determining the unknown in the transformation equations.

3. A method as defined in claim 1 including the step of introducing a reference plane with more than two space points into the spatial object to be measured for increasing the accuracy in determining the two projection centers.

4. A method as defined in claim 1 wherein more than two photographs are taken with varying spatial positons of the projection centers for controlling purposes.

5. A method as defined in claim 1 wherein the intersection of said two straight lines is first carried out in said reference plane, and arranging said two straight lines in said reference plane to intersect between a ground mark of said projection center and the transformed image points to determine thereby the position coordinates of the selected object point, the height of the selected object point above the reference plane being evaluated in accordance with a distance ratio.

6. A method as defined in claim 1 wherein an intersection is formed in said reference plane between said straight lines through transformed image points and ground marks of the space points, the height of said projection center above said reference plane being evaluated in accordance with a distance ratio for determining the spatial position of said projection center.

7. A method as defined in claim 1 wherein an intersection is formed between said two straight lines through said transformed image points and said space points for determining the spatial position of a projection center when using two space points outside said reference plane with a common ground mark.

8. An arrangement for producing photographic pictures suitable for photogrammetric survey of a spatial object, particularly after traffic accidents, comprising: a frame having at least four space points in a quadrangle and in a plane forming a reference plane; two photographs being taken using central projection with different positions of a projection center; said photographs being evaluated by determining image coordinates of selected object points and control points selected in said spatial object; said control points being part of a control point system, said system comprising: said reference plane which said four points have known position coordinates defining said quadrangle, said frame having at least two space points located outside said reference plane, the coordinates of the six points being known relative to one another; said photographs being evaluated by determining image coordinates of said control points and determining image coordinates of the six points.

9. An arrangement as defined in claim 8 wherein said space points outside said reference plane have different ground marks.

10. An arrangement as defined in claim 8 wherein said space points outside said reference plane have a common ground mark.

11. An arrangement as defined in claim 8 wherein said four points in said reference plane of said frame form a rectangle.

12. An arrangement as defined in claim 8 wherein said control point system is transportable.

* * * * *